(12) United States Patent
Mann et al.

(10) Patent No.: US 7,212,889 B2
(45) Date of Patent: May 1, 2007

(54) SYSTEM FOR EXCHANGING DATA BETWEEN DEVICES IN A MOTOR VEHICLE AND AN EXTERNAL INPUT/OUTPUT TERMINAL

(75) Inventors: Torsten Mann, Lauffen (DE); Martin Reimann, Hamm (DE)

(73) Assignee: Atmel Germany GmbH, Heilbronn (DE)

( * ) Notice: Subject to any disclaimer, the term of this patent is extended or adjusted under 35 U.S.C. 154(b) by 386 days.

(21) Appl. No.: 10/826,169

(22) Filed: Apr. 15, 2004

(65) Prior Publication Data
US 2004/0230348 A1    Nov. 18, 2004

(30) Foreign Application Priority Data
Apr. 16, 2003   (DE) ................ 103 17 499

(51) Int. Cl.
*G06F 17/00* (2006.01)
(52) U.S. Cl. .............. 701/1; 701/36; 307/9.1
(58) Field of Classification Search ............ 701/1, 701/36, 29; 340/505, 5.1, 5.2, 5.21, 5.6, 340/5.61, 5.8; 307/9.1, 10.1–10.6
See application file for complete search history.

(56) References Cited

U.S. PATENT DOCUMENTS

| | | | | |
|---|---|---|---|---|
| 5,254,996 A | * | 10/1993 | Claar et al. .......... | 341/176 |
| 5,633,484 A | | 5/1997 | Zancho et al. | |
| 5,832,296 A | | 11/1998 | Wang et al. | |
| 6,028,537 A | * | 2/2000 | Suman et al. ......... | 340/988 |
| 6,182,006 B1 | | 1/2001 | Meek | |
| 6,349,257 B1 | | 2/2002 | Liu et al. | |
| 2002/0062185 A1 | | 5/2002 | Runge et al. | |

FOREIGN PATENT DOCUMENTS

| | | |
|---|---|---|
| DE | 3900494 | 7/1990 |
| DE | 4238301 | 5/1994 |
| DE | 4422296 | 11/1994 |
| DE | 4445537 | 6/1996 |
| DE | 19548393 | 7/1996 |
| DE | 69621330 | 2/1998 |
| DE | 19728226 | 1/1999 |
| DE | 10107263 | 8/2002 |
| DE | 10121350 | 11/2002 |
| DE | 10134437 | 2/2003 |

* cited by examiner

*Primary Examiner*—Y. Beaulieu
(74) *Attorney, Agent, or Firm*—W. F. Fasse; W. G. Fasse

(57) ABSTRACT

A portable data exchange device including a data input, a data output, and a memory is incorporated into a mechanical or electronic key that is required for operating a motor vehicle. The data exchange device can exchange data bi-directionally or uni-directionally with a data processing device in the vehicle and with an external input/output terminal. The data may include vehicle-specific and/or driver-specific data relating to various systems of the vehicle. The data are transmitted to and from the device in the key in a wireless or direct-contacting manner. This device incorporated in the key avoids the need for carrying a separate data unit for exchanging data between the on-board data processing device of the vehicle and the external input/output terminal.

25 Claims, 2 Drawing Sheets

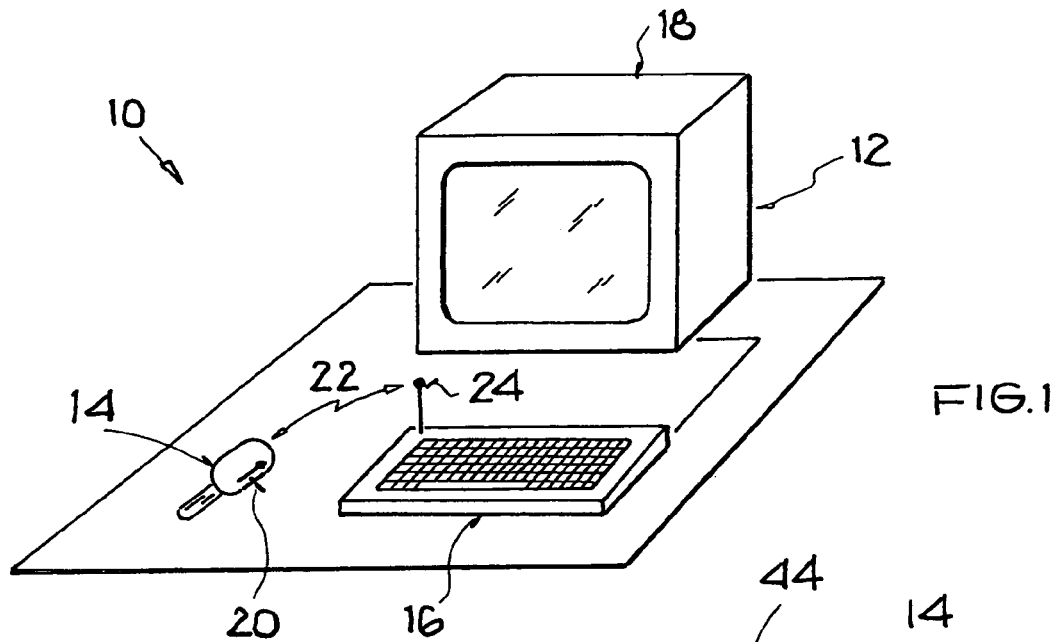
FIG.1
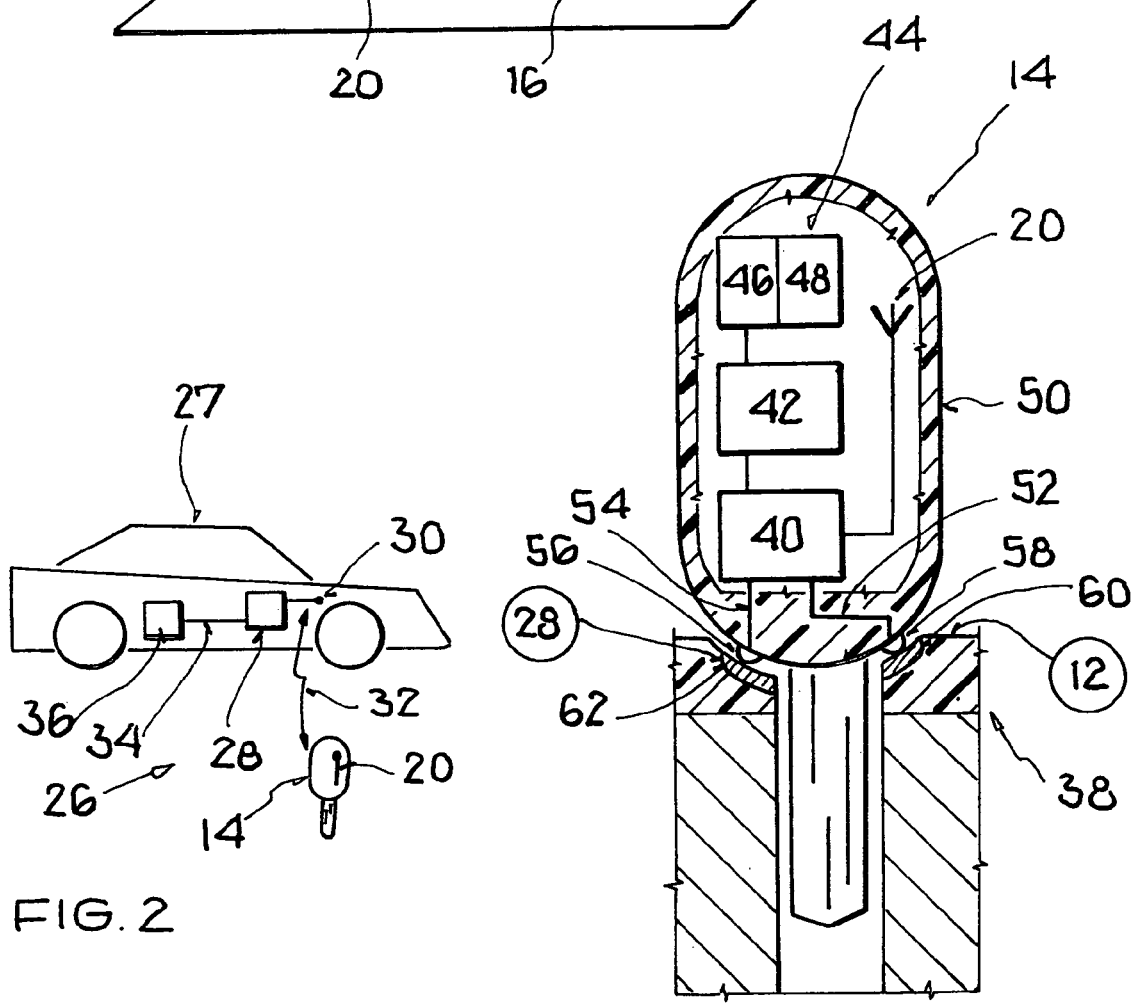
FIG.2
FIG.3

SYSTEM FOR EXCHANGING DATA BETWEEN DEVICES IN A MOTOR VEHICLE AND AN EXTERNAL INPUT/OUTPUT TERMINAL

PRIORITY CLAIM

This application is based on and claims the priority under 35 U.S.C. §119 of German Patent Application 103 17 499.0 filed on Apr. 16, 2003, the entire disclosure of which is incorporated herein by reference.

FIELD OF THE INVENTION

The invention relates to a portable device for exchanging data between at least one data processing device in a motor vehicle and an external input/output terminal, as well as a data exchange system including such a portable data exchange device.

BACKGROUND INFORMATION

Today's motor vehicles have sophisticated electrical and electronic systems including one or more data processing devices that receive, store and process data, and then display information, provide other data, and/or issue control commands in response to the data processing. For example, automobiles may include a navigation system for processing route and location data, and then displaying suggested navigation information for the driver. Other data processing devices in motor vehicles include control devices for controlling the engine, the transmission, and other components of the motor vehicle. Car phones provided in motor vehicles may also be equipped with data processing devices. These are just a few non-exhaustive examples of the data processing devices that are conventionally provided in motor vehicles.

Separately and externally from motor vehicles, various different electronic input/output terminals are conventionally in use: For example, it is quite typical today that a person will use a stationary (i.e. desktop) computer at home and/or at work, and/or a portable laptop computer, and/or a portable electronic organizer or personal digital assistant. All of these devices, and still others, represent input/output terminals that can be used to input, receive, format, manipulate and then output various data as desired by the user.

To the present date, there have been only limited and rather cumbersome efforts to provide any interface or data exchange connection between the data processing devices in a motor vehicle and an external input/output terminal. One such conventional system is disclosed in U.S. Pat. No. 6,182,006 (Meek). This prior Patent proposes a separate remote control unit for exchanging data between an external input/output terminal or device and a navigation system in a motor Vehicle. Particularly, the remote control unit receives and stores data from an external input/output terminal, whereby these data may, for example, represent a list of addresses to which the driver of the motor vehicle intends to drive. Once the data is loaded into the remote control unit from the input/output terminal, the remote control unit is then carried to the motor vehicle and installed therein close to the motor vehicle's navigation system. Particularly, the remote control unit must be mounted so as to be able to carry out a close-range data exchange, for example preferably via an infrared transmission interface. Via this infrared interface, the remote control unit carries out a handshake process with the vehicle's navigation system, and then transmits the stored data to the navigation system.

The conventionally known system for exchanging data between an external input/output terminal and the navigation system of a vehicle suffers several disadvantages. Most significantly, this conventional system requires a specialized separate device, namely the specialized remote control unit, which must be separately carried, manipulated, and installed or mounted in the vehicle by the driver. Thus, the additional remote control unit represents additional "clutter" and complexity for the driver, and can easily be forgotten, misplaced, or lost. For these reasons, using the conventional system becomes an additional burden on the driver.

SUMMARY OF THE INVENTION

In view of the above, it is an object of the invention to provide a portable device as well as a data exchange system including such a portable device, for exchanging data between a data processing device in a motor vehicle and an external input/output terminal, which does not require the driver to carry or use an additional separate device, so as to reduce or minimize the burden on the driver when preparing to drive the vehicle. Another object of the invention to increase the reliability as well as the universal applicability for carrying out the exchange of data between data processing devices of the vehicle and an external input/output terminal. The invention further aims to avoid or overcome the disadvantages of the prior art, and to achieve additional advantages, as apparent from the present specification. The attainment of these objects is, however, not a required limitation of the invention.

The above objects have been achieved according to the invention in both a portable data exchange device as well as a data exchange system including such a device, in that the portable data exchange device is incorporated in an authorization device that is required for accessing, starting and/or operating the motor vehicle. Such a device is generally termed a "vehicle operation authorization device" or simply "authorization device" herein, and is exemplified by a mechanical key, an electronic "key" such as an electronic or magnetic key card or especially an electronic chip card. What all such vehicle operation authorization devices share in common, is that such a device is absolutely required for operating the motor vehicle. Thus, if the driver is going to operate the motor vehicle, the driver must necessarily have the authorization device (e.g. the key) in his possession. For example, it is typical that a person who intends to drive a car will carry the ignition key required for the car in a trouser pocket, a pocketbook, a purse, or the like, and will also take the key when leaving the car. It is such a common and longstanding practice to carry and use an ignition key for a motor vehicle in this manner, so that it is not regarded as a burden or inconvenience to do so.

By incorporating or embodying the portable data exchange device in a vehicle operation authorization device, such as a mechanical or electronic ignition key, the invention assures that the most recent data intended for exchange will necessarily and reliably be carried to the motor vehicle, without additionally burdening the driver. In other words, since the driver must necessarily have the authorization device with him to operate the vehicle, the driver cannot forget or leave behind the data exchange device. Also, the driver is not additionally burdened by having to carry an extra or separate device, but instead merely has to carry the ignition key as he has typically been doing even before the provision of the inventive data exchange system.

Incorporating the data exchange device into the authorization device, preferably the ignition key, provides several further advantages as well. Upon leaving the vehicle, the driver typically carries the ignition key with him to whatever locations he visits, such as his home, his workplace, etc. Thus, the driver will also have the key (with the incorporated data exchange device) readily available to interface with any input/output terminals (e.g. personal or business computers) that are provided for the driver's use at such locations. Thus, not only when preparing to drive the vehicle, but also when leaving the vehicle, the driver cannot forget to take the data exchange device with him, because it is incorporated or embodied in the ignition key. The data exchange device is thus readily available to interface with the external input/output terminals and carry out a data exchange therewith. The driver does not need to remember and carry any additional or separate device serving as a data memory or the like. Thereby, the burden on the driver is reduced.

More particularly according to the invention, the inventive data exchange device may comprise electronic circuitry necessary for the data exchange functions (e.g. an input arrangement, an output arrangement, a memory, and/or a processor) incorporated in the handle of a typical mechanical ignition key. Alternatively, the data exchange device may be integrated in a smart card that can be selectively plugged into or removed from a mating receptacle recess in a mechanical ignition key. As a further alternative, the data exchange device can be embodied in a chip card that functions as an electronic key or vehicle operation authorization device.

A further advantage of the invention arises from the fact that the vehicle operation authorization device (such as the ignition key) is individually and unambiguously allocated in a fixed manner to a particular vehicle. Thus, the data exchange device incorporated or embodied in the authorization device will necessarily also be allocated to the corresponding particular vehicle. This ensures that vehicle-specific data may be carried by the data exchange device and will only be transferred to or from the specific intended vehicle. For example, such vehicle-specific data may involve vehicle operation and performance settings, such as engine control settings, transmission control settings, vehicle diagnostic data provided by the onboard systems of the vehicle, or vehicle-specific data provided by a vehicle manufacturer or vehicle servicing center. For example, such data can be externally provided through the input/output terminal in the form of a computer connected via the internet to a server computer of the vehicle manufacturer or a vehicle servicing center. Such vehicle-specific data could thus include service reminders or even recall information related to a particular vehicle, being triggered, for example, based on the known vehicle model, engine type, transmission type, other options, the actual existing odometer data, the diagnostic codes, or the like provided by the data processing systems of the vehicle itself. All such data are linked to a specific vehicle, SO that the data exchange must be clearly and unambiguously linked to the particular intended vehicle.

On the other hand, a particular key (whether it be a mechanical key or a chip card or smart card providing the function of an electronic key) is typically also linked to a particular person, i.e. a particular driver. Thus, it is also possible to load and exchange driver-specific data via the inventive data exchange device. Since the particular driver carries the particular ignition key with him, and thus also carries the inventive data exchange device with him, it is ensured that the driver's own driver-specific data come with him and are thereby associated with him when he operates the vehicle. Such driver-specific data may, for example, involve driver seat position adjustments, mirror adjustments, shift program preferences for an automatic transmission (e.g. "sport" or "economy" shifting), engine parameter preferences such as an acceleration program, suspension characteristic preferences ("comfort" or "sport" settings) or the like.

In this manner, a motor vehicle that is used by more than one driver (each using a respective individual or personal key) will "automatically" be adjusted and operate according to the particular driver's desired settings. This is achieved, because the corresponding driver-specific data are stored in the driver's personal key and are automatically transferred to the appropriate data processing devices of the motor vehicle when the driver enters the vehicle and initiates the operation of the vehicle. A different driver who is also authorized to operate this vehicle will have a different key that is allocated to this vehicle (e.g. "fits" the ignition lock of the vehicle), and incorporates a data exchange device that is loaded with the same vehicle-specific data, but different driver-specific data in comparison to the above mentioned first driver. Thus, when a different driver enters the vehicle and uses the key to initiate the operation of the vehicle, the vehicle will now be "automatically" re-adjusted set to this driver's preferences, based on the corresponding driver-specific data provided by this driver's data exchange device.

A further advantage of the invention is that the data exchange device incorporated in the key or other vehicle operation authorization device provides a data exchange interface that is uniform, standardized, and, if necessary, updatable, with respect to the relatively short-lived external environment related or connected to the input/output terminals, for example the internet. Namely, even though the data exchange protocols, parameters, or requirements of the external data environment through the input/output terminals may change over time, it is not necessary to change or update the data processing devices in the motor vehicle. Instead, it is only necessary to ensure that the data exchange device incorporated in the key or the like is updated as necessary to be compatible with both the external environment connected through the input/output terminals and the data system onboard the motor vehicle. Thereby, the data exchange with data processing devices of the motor vehicle can still be maintained even when the data transmission standards of the external environment have changed.

Also, the data exchange provided via the portable data exchange device according to the invention can be a reliable and secure data exchange, especially because the input/output terminal used in the inventive system can be equipped with the latest security devices, in terms of both software as well as hardware. For example, the input/output terminal can include the latest updated virus protection software as well as hardware and/or software firewall protection. Since the portable data exchange device according to the invention receives its data only from the secure (e.g. virus protected) input/output terminal, the data exchange device itself does not need to be secured or protected in this manner. The input/output terminal may then be connected to the internet or the like to download desired data without any fear or danger of corrupted or malicious data being transmitted via the portable data exchange device, because the input/output terminal provides the protected gateway.

For example, the vehicle manufacturer may provide data available on a protected server on the internet, so that any authorized user can access and download this data via the firewall and virus protected input/output terminal, to be further transferred and loaded to the portable data exchange device. In comparison to a direct connection of the onboard data processing devices or systems of the motor vehicle to the internet, the inventive system provides greater simplicity and security and does not require virus or other protection to be installed or updated in the vehicle itself.

For carrying out the necessary data exchange functions, the portable data exchange device preferably comprises a data input, a data output, and a memory for storing the data. The memory preferably includes several distinct memory areas that are respectively allocated or linked to various different data processing devices in the motor vehicle. Thereby, various different data processing devices can be separately provided with the appropriate corresponding data in an individual manner. The data input and/or the data output may be embodied with connection contact terminals for carrying out a conductive or wire bound data transmission, e.g. via electrical conductor wires, or optical fibers, or the like. Alternatively, the data input comprises a receiver for electromagnetic waves while the data output comprises a transmitter for electromagnetic waves.

A particular preferred embodiment involves a data transmission via receiving and transmitting antennas by means of electromagnetic waves according to the Bluetooth specification. Transmission of data via electromagnetic waves compliant with the Bluetooth specification has various advantages. For example, data can be simultaneously transmitted from and to several data processing devices, which are located close to one another in the motor vehicle. Moreover, data transmission according to the Bluetooth specification makes it possible to provide an automatic error correction during the transmission, as well as encryption of the transmitted data. A further significant advantage in comparison to longwave infrared signals is that no direct line-of-sight connection is necessary for the data transmission.

Further in comparison to the conventionally known infrared transmission, the preferred inventive manner of transmission is insensitive to bright ambient lighting and particularly direct sunshine, and also provides a larger transmission range (approximately 10 m) along with a significantly reduced electrical power consumption.

With respect to an operating method, or particularly a time point for carrying out the data exchange according to the invention, the data is preferably exchanged between the portable data exchange device and the vehicle after opening the vehicle door and entering the vehicle, via an existing or provided air interface (e.g. wireless transmission link with transmitter and receiver) or in a direct contacting conductive manner. In the case of using a mechanical key as the vehicle operation authorization device, the data exchange can occur "automatically" upon inserting the key into the vehicle's ignition lock, which is outfitted with the necessary contact terminals. Alternatively, in the case of using a chip card as a vehicle authorization device, the data exchange can occur in a direct contacting or conductive manner after inserting the chip card into a suitable card reader in connection with a starting procedure of the vehicle.

BRIEF DESCRIPTION OF THE DRAWINGS

In order that the invention may be clearly understood, it will now be described in connection with example embodiments thereof, with reference to the accompanying drawings, wherein:

FIG. 1 is a schematic perspective view of a first portion of an inventive system including an input/output terminal and a vehicle ignition key incorporating a data exchange device;

FIG. 2 is a schematic illustration of a second portion of the inventive system including the vehicle ignition key shown in FIG. 1, together with a motor vehicle including data processing devices;

FIG. 3 is a schematic sectional view of the vehicle ignition key of FIGS. 1 and 2 inserted in a key receptacle such as a vehicle ignition lock;

Figure 4:
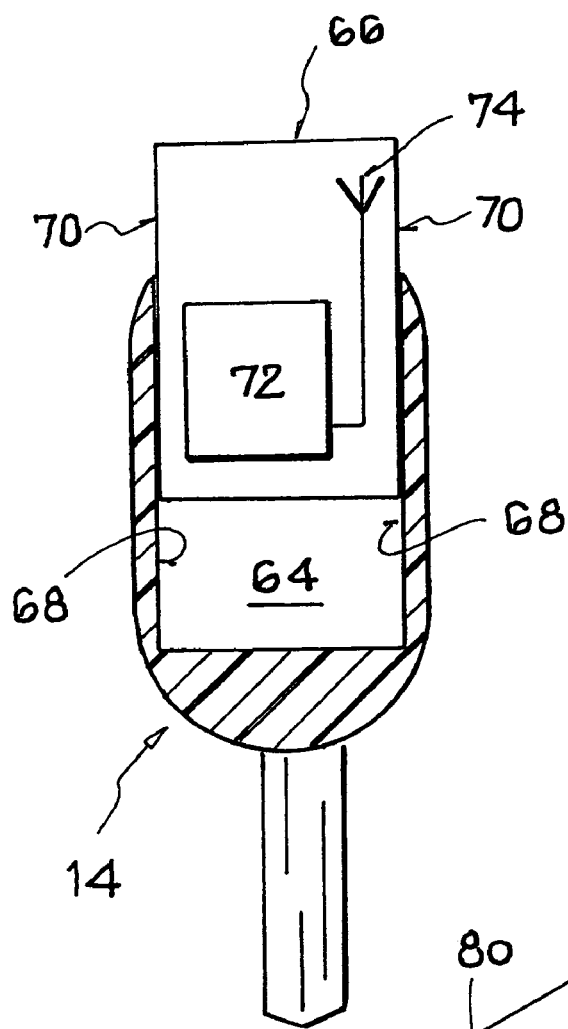
FIG. 4 is a schematic sectional view of an alternative embodiment of a vehicle ignition key into which a smart card embodying the data exchange device can be inserted.

DETAILED DESCRIPTION OF PREFERRED EXAMPLE EMBODIMENTS AND OF THE BEST MODE OF THE INVENTION

A data exchange system according to the invention includes a motor vehicle 27, an input/output terminal 12 external or separate from the motor vehicle 27, and a vehicle operation authorization device such as an ignition key 14 incorporating a data exchange device. This inventive system is illustrated separately in two portions thereof in FIGS. 1 and 2 respectively.

FIG. 1 shows the external portion 10 of the overall inventive system, including the input/output terminal 12 and the vehicle ignition key 14. The terminal 12 includes a keyboard 16, for example, by which data can be input and/or manipulated in the input/output terminal 12, a monitor 18 or other display device by which data can be displayed, and an air interface 22 or wireless data transmission link established between an antenna 24 of the input/output terminal 12 and an antenna 20 of the data exchange device incorporated in the vehicle ignition key 14. Via this air interface 22, i.e. the two antennas 20 and 24, data may be exchanged between, i.e. to and from, the key 14 and the input/output terminal 12.

FIG. 2 shows the second vehicle-related portion 26 of the overall inventive system, including the motor vehicle 27 and the vehicle ignition key 14. Note that this is the same key 14 appearing as a component in FIG. 1. The motor vehicle 27 comprises at least one data processing device, i.e. a first data processing device 28, and an antenna 30 coupled thereto. The antenna 30 of the vehicle 27 and the antenna 20 of the data exchange device incorporated in the key 14 establish a second air interface 32 or wireless transmission link for the exchange of data between, i.e. to and from, the key 14 and the vehicle 27.

The air interface 32 of the second portion 26 of the inventive system, and also the air interface 22 of the first portion 10 of the inventive system are preferably wireless transmission interfaces for the transmission of data via electromagnetic waves in accordance with the Bluetooth specification. The transmission range of a Bluetooth transmission amounts to a few or several meters. Thus, the exchange of data between the first data processing device 28 in the vehicle 27 and the vehicle ignition key 14 can be carried out not only within the vehicle itself, but also in a circular range of a few meters outside of the vehicle 27. The same holds true for the data transmission between the vehicle ignition key 14 and the external input/output terminal 12. With such a Bluetooth wireless data transmission, there is no need to physically connect or plug the ignition key 14 into a contacting terminal or receptacle for carrying out the data exchange. It is also not necessary to establish a close line-of-sight link as would be necessary for an infrared transmission.

In the motor vehicle 27, the first data processing device 28 may, for example, be a vehicle navigation system. In this case, the data that are to be exchanged via the data exchange device incorporated in the key 14 may be driving route planning data or navigation data that have been processed or developed on the input/output terminal 12, transmitted to the key 14, and then carried with the key from the terminal 12 to vehicle 27, where the data are then further transmitted from the key 14 to the navigation system 28 for directing or executing the route plan in the vehicle. Since the key 14 is necessary in any event for operating the vehicle 27, the key 14 represents a convenient and non-burdensome data exchange device for the exchange of data from the input/output terminal 12 to the first data processing device 28 in the vehicle 27.

Additionally or alternatively, data can also be exchanged in the opposite direction, namely from the vehicle 27 to the data exchange device incorporated in the key 14, and then from the key 14 to the input/output terminal 12. Such data may, for example, be data that describe an actual driving route that has been followed by the vehicle as recorded by the navigation system 28. These actual route data can then be transmitted via the key 14 to the terminal 12, where the data can be further processed, for example for maintaining an electronic travel log, vehicle fleet logistics, travel expense accounting, or the like.

As further shown in FIG. 2, the motor vehicle 27 may additionally comprise a second or further data processing device 36, which is preferably connected via a bus system 34 with the first data processing device 28 and therewith also to the antenna 30. As an example, the second data processing device 36 may be a control device such as an engine controller, transmission controller or the like of the vehicle. In this context, the data to be exchanged from the vehicle 27 via the key 14 to the terminal 12 could be actual vehicle performance data, engine diagnostic data, error codes, or the like recorded by the second data processing device 36, which data are to be displayed or processed on the terminal 12. Additionally or alternatively in this context, data such as vehicle operation and performance settings or driver-specific settings can be exchanged from the terminal 12 via the key 14 to the second data processing device 36 of the vehicle 27.

While FIGS. 1 and 2 schematically represent an inventive system that uses a wireless transmission link, e.g. via the air interfaces 22 and 32, the inventive system can alternatively use a direct contacting (e.g. wire bound) conductive transmission connection. In fact, the vehicle ignition key 14 can be equipped with the necessary elements for carrying out either one or both of the wireless transmission and the wire-bound contacting transmission.

FIG. 3 schematically illustrates an exemplary structure of the ignition key 14 incorporating the inventive data exchange device. Particularly, the key includes a plastic casing 50 forming the handle or finger grip of the key, and a key blade (which mates with an ignition lock) protruding therefrom. The necessary electronics of the data exchange device are incorporated in a hollow cavity of the plastic casing 50, and could be embedded or encased in resin therein. Particularly, the electronics making up the data exchange device incorporated in the key 14 include an input/output component 40 connected via a processor 42 with a memory 44. The memory preferably comprises a first memory area 46, a second memory area 48, and possibly further memory areas if applicable. Each of these memory areas 46 and 48 is respectively reserved for a particular type of data (e.g. engine diagnostic data, navigation data, or the like) and/or is respectively individually allocated to specific data processing devices 28 and 36 in the vehicle 27.

The electric circuitry further includes an antenna 20 connected to the input/output component 40 to carry out the wireless transmission to and from the key 14 as described above. Particularly, the driver or user of the key 14 may manually actuate a data transmission (e.g. by depressing a button, not shown) in order to transmit data from the memory 44 in the key 14 via the antenna 20 to the antenna 24 of the input/output terminal 12 or to the antenna 30 of the motor vehicle 27, and/or to read data into the memory 44 of the key 14 from the input/output terminal 12 via the antennas 24 and 20 or from one of the data processing devices 28 or 36 of the vehicle 27 via the antennas 30 and 20. Preferably, these data transmissions shall comply with the Bluetooth specification.

As mentioned above, instead of a wireless data transmission via the air interfaces 22 and 32, the data transmission can be carried out in a direct-contacting manner via suitable conductors such as electrical conductor wires or optical conductor fibers. For this purpose, the electronics of the data exchange device incorporated in the key 14 further comprise a first data input line 52 and a second data output line 54 respectively connected to the input/output component 40. The first data input line 52 terminates in a first input contact pin 58, while the second data output line 54 terminates in a second output contact pin 56. To carry out the direct contacting data transmission, a suitable key receiving device or key receptacle 38 receives the blade of the key 14 while establishing the data transmission contact. In this regard, the key receptacle 38 comprises a first counter contact 60 for contacting the first input contact pin 58 of the key 14, and a second counter contact 62 for contacting the second output contact pin 56 of the key 14.

When a data transmission is to be carried out between the key 14 and the onboard electronics of the vehicle 27 as represented in FIG. 2, the key receptacle 38 can be embodied as the ignition lock of the vehicle 27. In this regard, data can then be transmitted from the key 14 through the input/output component 40 via the data output line 54 through the contact pin 56 and the cooperating counter contact 62 to the first data processing device 28 in the vehicle 27, and further through the bus system 34 to additional data processing devices 36 in the vehicle 27. Alternatively, data can be exchanged from these vehicle-based data processing devices 36 and 28 to the key 14 through the counter contact 60, the cooperating input contact pin 58, the connected data input line 52, and the input/output component 40 of the key 14.

On the other hand, the key receptacle 38 can be embodied as a peripheral device for carrying out a data transmission between the key 14 and the input/output terminal 12 as generally represented in FIG. 1. As a further alternative, the key receptacle 38 could even be integrated directly into the input/output terminal 12. In this case, data may be transmitted from the input/output terminal 12 via the counter contact 60 of the key receptacle 38 to the first contact pin 58 of the key 14, to further conduct the data via the data input line 52 to the input/output component 40 of the key 14. For a data transmission in the opposite direction, i.e. to exchange data from the key-14 to the input/output terminal 12, the data stored in the memory 44 can be transmitted via the input/output component 40 and the data output line 54 to the output contact pin 56 which contacts the second counter contact 62 to convey these data to the input/output terminal 12.

While FIG. 3 shows, and the above discussion relates to, an embodiment suitable for a bi-directional transmission between the key 14 and the input/output terminal 12, and also between the key 14 and the vehicle 27, such a two-sided bi-directional data transmission is not required in all applications. Instead, it may be sufficient for a particular application to provide only a data input to the key 14 from the input/output terminal 12, and only a data output from the key 14 to the vehicle 27. In other words, such an application would provide for the transmission or exchange of data only from the terminal 12 to the vehicle 27 via the key 14, but would not allow data to be transmitted from the vehicle 27 via the key 14 back to the terminal 12. In such an application, the key receptacle 38 connected to the terminal 12 only needs to have the first counter contact 60 and can omit the second counter contact 62, while the key receptacle 38 connected to the motor vehicle 27 only needs the second counter contact 62 and can omit the first counter contact 60. An opposite uni-directional data exchange from the vehicle 27 to the terminal 12 via the key 14 could alternatively be provided.

Instead of the embodiment of the key 14 with hard-wired electronic components incorporated therein to form the data exchange device according to FIG. 3 as discussed above, FIG. 4 shows an alternative embodiment of the portable data exchange device based on a smart card 66, for example, that is inserted in a recess 64 in the vehicle ignition key 14. Thus, the key 14 still serves as the carrier or platform for the data exchange device to cooperate with the input/output terminal 12 and the data processing devices 28 and 36 in the vehicle 27 in the same manner discussed above, but the data exchange device components are integrated in a removable smart card 66 rather than being hardwired in the key 14. So-called smart cards are known per se, and generally comprise a processor, a memory, and an interface by which the processor can communicate with a prescribed external system.

The recess 64 in the key 14 has inner edges 68 that guide and hold the outer edges 70 of the smart card 66. The above mentioned components, e.g. the processor, the memory, and the interface components, are integrated into an integrated circuit 72 and are connected to an antenna 74 to receive and transmit the data in a wireless manner as discussed above. Instead of, or in addition to, the antenna 74, the integrated circuit 72 can be connected in a direct-contacting conductive manner, for example through conductive contacts provided in rails along the inner edges 68 of the recess 64 and the outer edges 70 of the smart card 66, to contact elements similar to 52, 54, 56 and 58 shown and described in connection with FIG. 3.

Figure 5:
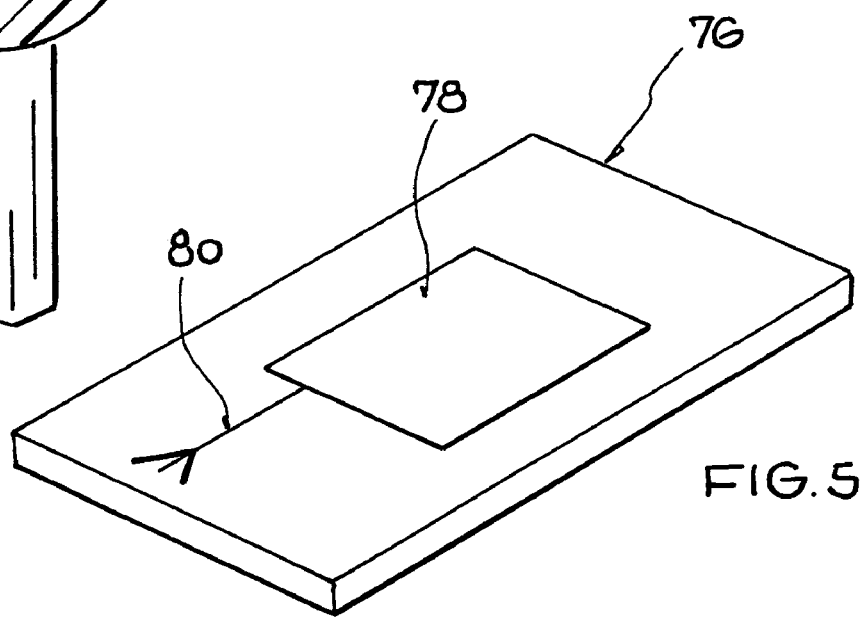
FIG. 5 is a schematic view of a chip card embodying an electronic "key" and incorporating the inventive data exchange device.

While the above examples relate to the inventive data exchange device incorporated in a mechanical key 14 for the vehicle, the invention can alternatively be embodied in an electronic "key" for example an electronic chip card 76 as shown in FIG. 5. Such a chip card 76 replaces a conventional mechanical ignition key 14, and is used in so-called "keyless-go-systems". In this regard, the chip card 76 takes over the pertinent functions of the mechanical ignition key 14, namely the vehicle operation authorization functions. Thus, the chip card 76 carries electronic access codes or the like that give the holder of the chip card 76 access and authorization to start and operate the vehicle, in the manner of an electronic "key".

The chip card 76 comprises an integrated circuit 78 connected to an antenna 80 by which data can be transmitted or received in a wireless manner. Alternatively or additionally, the chip card 76 can include physical conductors and contacts for carrying out a direct contacting conductive data transmission, for example as discussed above in connection with FIG. 3, when the card 76 is plugged into a suitable card reader in the vehicle 27 or connected to the terminal 12. The integrated circuit 78 of the chip card 76 comprises and carries out the functions of the input/output component 40, the processor 42, and the memory 44 of the electronic arrangement shown and described in connection with FIG. 3. In order to authorize the access and operation of the vehicle, the chip card 76 merely needs to be present within a wireless transmission range of the wireless reader installed in the vehicle, or physically plugged into a suitable card reader in the vehicle. Thereby, the data exchange of the additional data according to the invention is carried out together with or in addition to the data exchange required for the key function, i.e. the authorization to operate the vehicle.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A portable handheld device comprising:
   a portable authorization device required for enabling operation of a motor vehicle; and
   a portable data exchange device that is incorporated in said portable authorization device, and that comprises a data memory, a data input connected directly or indirectly to said data memory, and a data output connected directly or indirectly to said data memory;
   wherein said data input and said data output are configured, arranged and adapted to communicate with both a data processing device included in the motor vehicle as well as a data input/output terminal that is external and separate from the motor vehicle.

2. The portable handheld device according to claim 1, wherein said authorization device is a vehicle key.

3. The portable handheld device according to claim 2, wherein the motor vehicle includes a mechanically operative ignition lock, and said vehicle key is a mechanically operative ignition key that is adapted to mate with the ignition lock so as to unlock and operate the ignition lock.

4. The portable handheld device according to claim 2, wherein said vehicle key includes a key blade protruding from a hand grip, and said data exchange device comprises electronic circuit components encased within said hand grip.

5. The portable handheld device according to claim 2, wherein said vehicle key includes a key blade protruding from a hand grip having a recess therein, and said data exchange device comprises electronic circuit components integrated on a smart card that is removably received in said recess in said hand grip.

6. The portable handheld device according to claim 2, wherein the motor vehicle includes an electronically operative ignition lock, and said vehicle key is an electronically operative key that stores authorization data and is adapted to communicate said authorization data to the ignition lock to unlock and operate the ignition lock.

7. The portable handheld device according to claim 1, wherein said authorization device is a chip card that stores authorization data required for enabling operation of the motor vehicle, and said data exchange device comprises electronic circuit components integrated on said chip card.

8. The portable handheld device according to claim 1, wherein at least one of said data input or said data output is adapted to communicate with at least one of the data processing device or the data input/output terminal via only a unidirectional data communication.

9. The portable handheld device according to claim 1, wherein at least one of said data input or said data output is adapted to communicate with at least one of the data processing device or the data input/output terminal via a bi-directional data communication.

10. The portable handheld device according to claim 1, wherein said data exchange device stores vehicle-specific data that are specific to the motor vehicle.

11. The portable handheld device according to claim 10, wherein said data exchange device further stores driver-specific data that are specific to a particular driver of the motor vehicle to whom said authorization device is allocated.

12. The portable handheld device according to claim 1, wherein said data exchange device stores driver-specific data that are specific to a particular driver of the motor vehicle to whom said authorization device is allocated.

13. The portable handheld device according to claim 1, wherein said data exchange device comprises a data input/output arrangement including an input portion comprising said data input and an output portion comprising said data output.

14. The portable handheld device according to claim 1, wherein the data processing device of the motor vehicle includes a first data processing device and a second data processing device, and said data memory of said data exchange device includes a first memory area that is allocated to the first data processing device and a second memory area that is distinct from said first memory area and that is allocated to the second data processing device.

15. The portable handheld device according to claim 13, wherein said input portion of said data input/output arrangement comprises a receiver and an antenna connected thereto adapted to receive electromagnetic waves.

16. The portable handheld device according to claim 13, wherein said output portion of said data input/output arrangement comprises a transmitter and an antenna connected thereto adapted to transmit electromagnetic waves.

17. The portable handheld device according to claim 13, wherein said data input/output arrangement comprises an antenna and a transmitter/receiver connected thereto adapted to transmit and receive electromagnetic waves according to the Bluetooth specification.

18. The portable handheld device according to claim 13, wherein at least one of said input portion or said output portion of said data input/output arrangement respectively comprises a signal conductor connected to a contact terminal located externally accessibly on said portable authorization device and adapted to carry out a conductor-bound data exchange.

19. A data exchange system comprising said portable handheld device according to claim 1, in combination with said motor vehicle including said data processing device, and said data input/output terminal that is external and separate from said motor vehicle.

20. The data exchange system according to claim 19, wherein said data input/output terminal is a computer terminal connected to the internet.

21. The data exchange system according to claim 20, further comprising a computer at a facility of a manufacturer of said motor vehicle or a facility of a servicing center for servicing said motor vehicle, wherein said computer is connected to and carries out a data exchange with said data exchange device via the internet and said computer terminal.

22. A data exchange system comprising said portable handheld device according to claim 1, in combination with said motor vehicle including said data processing device, and further including a vehicle input/output arrangement connected directly or indirectly to said data processing device, and a mechanical or electronic vehicle lock that selectively enables and prevents operation of said motor vehicle; and said data input/output terminal that is external and separate from said motor vehicle and that includes a terminal processor and a terminal input/output arrangement connected directly or indirectly to said terminal processor;

wherein said portable authorization device comprises a portable mechanical or electronic key that cooperates with and is required for activating said vehicle lock to enable operation of said motor vehicle; and wherein said portable data exchange device is incorporated in said key, and further comprises a processor connected to said data memory, and a key input/output arrangement that includes said data input and said data output, and that is connected to said processor and adapted to carry out a communication respectively with said vehicle input/output arrangement and said terminal input/output arrangement.

23. The data exchange system according to claim 22, wherein each one of said input/output arrangements respectively comprises a wireless receiver/transmitter adapted to carry out a wireless reception and transmission of electromagnetic waves carrying data as said communication.

24. The data exchange system according to claim 22, wherein each one of said input/output arrangements respectively comprises signal conductors connected to contacts adapted to carry out a conductor-bound reception and transmission of signals carrying data as said communication.

25. A portable handheld device comprising:

a portable authorization device required for enabling operation of a motor vehicle; and a portable data exchange device that is incorporated in said portable authorization device, and that comprises a data memory having a first memory area and a second memory area distinct from said first memory area, a data input connected directly or indirectly to said data memory, and a data output connected directly or indirectly to said data memory;

wherein said data input and said data output are adapted to communicate with first and second data processing devices included in the motor vehicle and with a data input/output terminal that is external and separate from the motor vehicle; and wherein said first memory area of said data memory of said portable data exchange device is allocated to and adapted to communicate with the first data processing device of the motor vehicle, and said second memory area of said data memory of said portable data exchange device is allocated to and adapted to communicate with the second data processing device of the motor vehicle.

* * * * *